US006768792B2

(12) United States Patent
Brown et al.

(10) Patent No.: US 6,768,792 B2
(45) Date of Patent: Jul. 27, 2004

(54) IDENTIFYING CALL PARTIES TO A CALL TO AN INCOMING CALLING PARTY

(75) Inventors: Michael Wayne Brown, Georgetown, TX (US); Joseph Herbert McIntyre, Austin, TX (US); Michael A. Paolini, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/023,409

(22) Filed: Dec. 17, 2001

(65) Prior Publication Data

US 2003/0112949 A1 Jun. 19, 2003

(51) Int. Cl.[7] .......................... H04M 3/42; H04M 1/64; H04M 15/06; H04M 1/56
(52) U.S. Cl. .............................. 379/207.14; 379/88.26; 379/142.03; 379/210.03
(58) Field of Search ................... 379/127.01, 142.05, 379/142.06, 142.08, 142.1, 207.01, 207.13, 208.01, 215.01, 33, 35, 142.01, 201.01, 88.13, 112.01, 88.19, 67.01, 142.03, 202.01, 88.02, 88.26, 88.01, 210.03; 704/273

(56) References Cited

U.S. PATENT DOCUMENTS

| 4,947,421 | A | * | 8/1990 | Toy et al. ................... 379/67.1 |
| 5,388,150 | A | * | 2/1995 | Schneyer et al. ........ 379/88.19 |
| 5,471,519 | A | * | 11/1995 | Howe et al. .............. 379/88.26 |
| 5,499,288 | A | | 3/1996 | Hunt et al. ................... 379/88 |
| 5,590,171 | A | * | 12/1996 | Howe et al. ................... 379/33 |
| 5,673,404 | A | | 9/1997 | Cousins et al. ............. 395/347 |
| 5,696,880 | A | * | 12/1997 | Gustafson et al. .......... 704/273 |
| 5,771,283 | A | * | 6/1998 | Chang et al. .......... 379/142.01 |
| 5,790,637 | A | | 8/1998 | Johnson et al. ............... 379/67 |
| 5,864,612 | A | * | 1/1999 | Strauss et al. ......... 379/142.03 |
| 5,915,001 | A | | 6/1999 | Uppaluru ................. 379/88.22 |
| 5,940,476 | A | | 8/1999 | Morganstein et al. ..... 379/88.02 |
| 5,946,654 | A | | 8/1999 | Newman et al. ............ 704/246 |
| 5,999,613 | A | * | 12/1999 | Nabkel et al. ......... 379/215.01 |
| 6,026,156 | A | * | 2/2000 | Epler et al. ............ 379/215.01 |
| 6,038,305 | A | | 3/2000 | McAllister et al. ......... 379/207 |
| 6,058,364 | A | | 5/2000 | Goldberg et al. ........... 704/252 |
| 6,101,242 | A | | 8/2000 | McAllister et al. ...... 379/88.02 |
| 6,122,357 | A | | 9/2000 | Farris et al. ................. 379/207 |
| 6,178,230 | B1 | | 1/2001 | Borland ..................... 379/67.1 |
| 6,304,648 | B1 | * | 10/2001 | Chang .................. 379/202.01 |
| 6,310,944 | B1 | * | 10/2001 | Brisebois et al. ...... 379/142.01 |
| 6,310,946 | B1 | * | 10/2001 | Bauer et al. ........... 379/208.01 |
| 6,327,343 | B1 | * | 12/2001 | Epstein et al. ........... 379/88.01 |

(List continued on next page.)

FOREIGN PATENT DOCUMENTS

| EP | 0585004 A2 | 3/1994 | ............ H04M/3/44 |
| EP | 0676882 A2 | 10/1995 | ............ H04M/1/27 |
| JP | 8139797 A | 5/1996 | .......... H04M/1/274 |
| JP | 10294784 A | 11/1998 | ............ H04M/1/57 |

OTHER PUBLICATIONS

WPAT Derwent 1994–067503, 1995–346415, 1996–315499, 1999–031530.

Primary Examiner—Ahmad F. Matar
Assistant Examiner—Thjuan P Knowlin
(74) Attorney, Agent, or Firm—Mark S. Walker; Amy J. Pattillo

(57) ABSTRACT

A method, system, and program for identifying parties to a call to an incoming calling party are provided. A context for a current call is identified, wherein the context comprises at least an identity of a caller and an identity of a callee to the current call. An identifier for an incoming calling party to the current call is identified. The context is filtered according to the identifier for the incoming calling party. Output of the filtered context to the incoming calling party is controlled.

51 Claims, 10 Drawing Sheets

U.S. PATENT DOCUMENTS

| | | | | |
|---|---|---|---|---|
| 6,327,347 B1 | * | 12/2001 | Gutzmann | 379/88.02 |
| 6,393,112 B1 | * | 5/2002 | Gottlieb et al. | 379/112.01 |
| 6,418,216 B1 | * | 7/2002 | Harrison et al. | 379/208.01 |
| 6,490,348 B1 | * | 12/2002 | Oomori et al. | 379/215.01 |
| 6,519,335 B1 | * | 2/2003 | Bushnell | 379/215.01 |
| 6,553,110 B1 | * | 4/2003 | Peng | 379/210.03 |
| 6,560,316 B1 | * | 5/2003 | Gundlach | 379/35 |
| 6,563,915 B1 | * | 5/2003 | Salimando | 379/208.01 |
| 2002/0067809 A1 | * | 6/2002 | Won | 379/88.19 |
| 2002/0181681 A1 | * | 12/2002 | Mani | 379/142.03 |
| 2002/0181683 A1 | * | 12/2002 | Mani | 379/201.01 |
| 2003/0043974 A1 | * | 3/2003 | Emerson | 379/88.13 |
| 2003/0152198 A1 | * | 8/2003 | Price | 379/67.1 |

* cited by examiner

IDENTIFYING CALL PARTIES TO A CALL TO AN INCOMING CALLING PARTY

CROSS-REFERENCE TO RELATED APPLICATIONS

The present application is related to the following copending applications:

(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,267;
(5) U.S. patent application Ser. No. 10/015,282;
(6) U.S. patent application Ser. No. 10/015,280;
(7) U.S. patent application Ser. No. 10/022,160;
(8) U.S. patent application Ser. No. 10/022,158;
(9) U.S. patent application Ser. No. 10/022,161;
(10) U.S. patent application Ser. No. 10/022,624;
(11) U.S. patent application Ser. No. 10/022,164; and
(12) U.S. patent application Ser. No. 10/022,163.

BACKGROUND OF THE INVENTION

1. Technical Field

The present invention relates in general to telecommunications and, in particular, to voice identification. Still more particularly, the present invention relates to identifying current parties to a call to an incoming calling party.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. A service, often referred to as Acaller ID@, provides the party receiving a call with the line number and name of the subscriber of the line number from which the call originates.

One limitation of caller ID is that the identity of the party actually making the call is not received, just the name of the line subscriber. For example, in a private network, if AJoe Smith@ is making a call from ATom Arnold's office line@ only the extension for ATom Arnold's office line@ and an identifier for ATom Arnold@ are transferred to the called party.

Another limitation of caller ID is that the identity of the party answering the call is not returned to the party making the call. For example, in a PSTN, a single line number may be answered by multiple parties, and at multiple telephone devices, where the caller ID does not identity the party answering the call.

A further limitation of caller ID is that a line number and line subscriber name provide a limited context for a call. For example, in a wireless network, where ATom Jenkins@ calls a friend's wireless number, ATom Jenkins@ does not receive any information about whether the call is wireless, how the call is being billed, and whether the wireless number is a business or personal number.

Services such as call waiting and call messaging allow a line subscriber to select options for directing a call, particularly where that call is incoming during a current call. For example, call waiting provides an alert to a line party that another caller is requesting to speak with that line party. The line party may select to switch the call to the requesting caller or the call may be directed to a call messaging service after a particular period of time. In addition, the line party may receive the caller ID of the requesting caller, such that the line party may determine whether it is necessary to switch to the requesting caller.

However, while caller ID is provided to a line party, a requesting party does not receive any indication of what type of call the requesting party may be interrupting or a reason that the requesting party was transferred to voice mail. Further, while providing the caller ID of the parties to a call to a requesting party may provide an indication of the line numbers involved in a call, only receiving line numbers provides a limited context. Moreover, it would not be advantageous to provide information about the parties to a call to every requesting party.

Therefore, in view of the foregoing, it would be advantageous to provide a method, system, and program for only providing the identities of parties to a current call to an incoming calling party, where the identity of the incoming party is on a preferred list of incoming calling parties allowed to receive current call information. Further, it would be advantageous to determine a context of a call and to determine current call information provided to an authorized incoming calling party according to the call context.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for identifying current parties to a call to an incoming calling party.

According to one aspect of the present invention, a context for a current call is identified, wherein the context comprises at least an identity of a caller and an identity of a callee to the current call. An identifier for an incoming calling party to the current call is identified. The context is filtered according to the identifier for the incoming calling party. Output of the filtered context to the incoming calling party is controlled.

According to another aspect of the present invention, an incoming call request is detected from an incoming calling party to a party from among a caller and callee to a current call. A context for the call in view of the incoming calling party is determined. The context for the call is distributed to the caller and to the callee.

A trusted telephone network preferably processes the call and initiates a context inference service to identify the context of a call. The context inference service may be initiated locally within the trusted telephone network or at a server located outside the trusted telephone network, with additional security applied for the communication channel.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
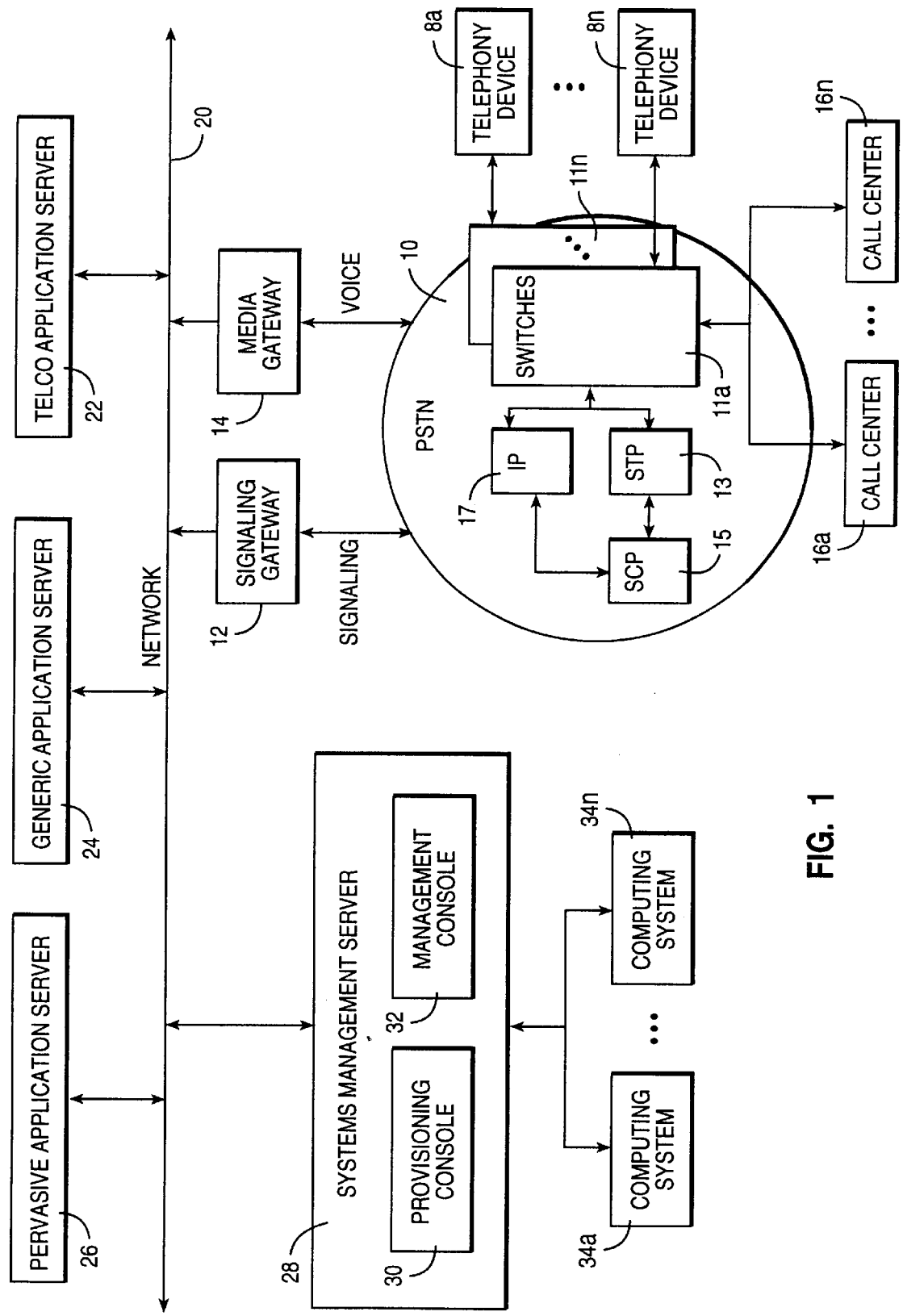
FIG. 1 depicts a block diagram of a network environment in which the present invention may be implemented.

A method, system, and program for identifying current parties to a call to an incoming calling party. For purposes of the present invention, current parties to a call include a caller and a callee. An incoming calling party may call either the caller or the callee. The identification of current parties provided to said incoming calling party may include a caller identification and/or a callee identification. In addition, identifying current parties to a call may include identifying the context of a call.

For purposes of the present invention, context may include, but is not limited to, the identity of the caller or callee, an identity of an on behalf of party to the call, whether the caller or callee is a backup from another party, device identities of the caller and callee telephony devices, the location of the caller and callee, scheduling information for the caller and callee, the path of a call, and billing information for the caller and callee. Location of the caller and callee may include, but is not limited to, the time zone, country, state, city, building location, or GPS location of a caller or callee.

Preferably, current parties to a call are only identified for the incoming calling party if the incoming calling party is authorized by the caller, callee, or line subscriber to receive the current call information. In addition, the current call information provided may include call context, however that call context is preferably filtered according to the identity of the incoming calling party.

Context for a call is preferably determined by a context inference engine located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

The identity of the caller and callee are preferably authenticated. In particular, identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may access a Telco Application service outside the trusted telephone network, where the Telco Application service is enabled to perform identity authentication. Performance of identity authentication has different advantages depending on the device initiating the identity authentication.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference engine preferably requests a caller profile according to VID to determine a caller identity according to a caller profile including caller billing preferences, caller subscriptions, caller scheduling and caller preferences and personal information. In addition, the context inference engine preferably determines the identity of the device utilized by accessing a device directory, prompting the caller to indicate the device identity, or other methods. Further, the location of the device may be inferred from information provided by the central office switch originating the call, a GPS location, and the location assigned to a line number. The context is preferably transferred to the central office switch and loaded therein.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, in the present invention, the context information is forwarded with a caller VID to the callee device. The callee is enabled to determine whether to answer a call, transfer the call to voice mail, or select from other call handling options, based on knowing the identity of the caller and the context of the call.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is enabled to determine whether the callee is the intended recipient.

In particular, in the present invention, a caller or callee profile may include an authorized incoming calling party list of VIDs that are authorized to receive current call context. Further, preferences for filtering the current call context for output to authorized VIDs are included.

According to an advantage of the present invention, the central office switch may detect a request from an incoming calling party to access either the caller or the callee. An identity for the incoming calling party may be authenticated. Further, a context of the incoming calling party call may be determined by the context inference service. Then, advantageously, the context inference service determines whether the incoming calling party may receive current call context according to an authorized calling party list set for a line number utilized in the call, by a caller, or by a callee.

Figure 2:
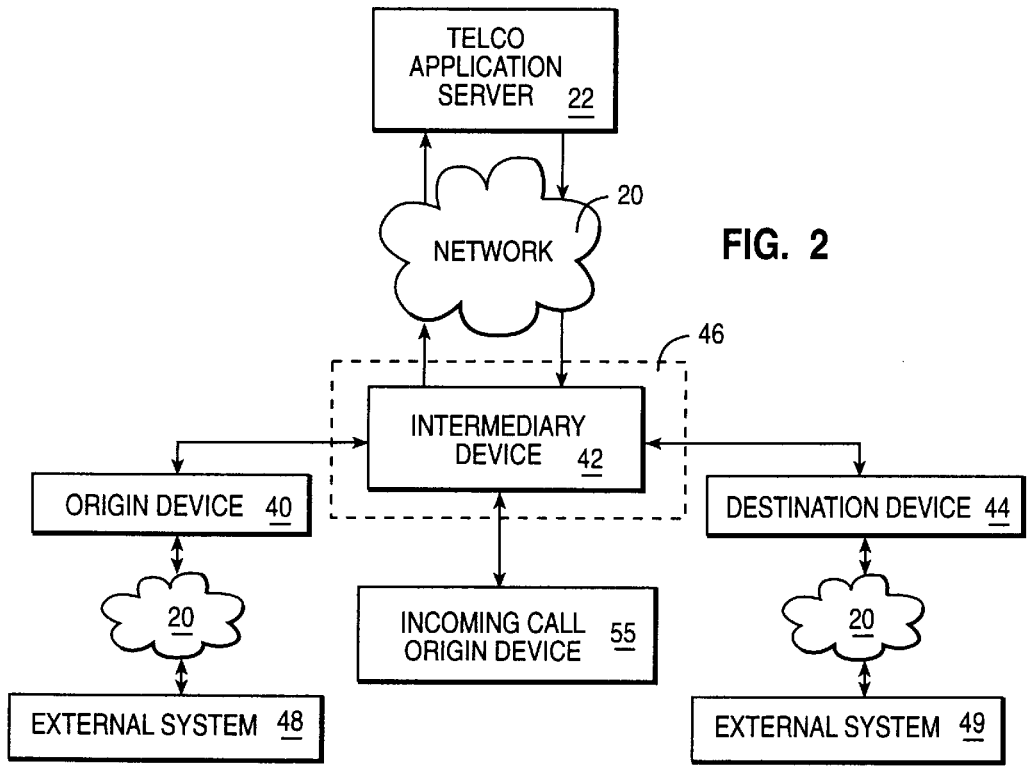
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference engines that perform context inference services. A context inference engine may utilize context information gathered from multiple databases and may gathered context information directly from a caller or callee in response to prompts.

Context may include, but is not limited to, the parties to a call, the line numbers accessed during a call, any on behalf of parties to a call, a subject matter of a call, device identities, the location of an origin or destination device, billing information, service subscriptions, the path of a call, and other information which may provide a caller or callee with context of a call. In addition, for purposes of the present invention, call context may include a list of authorized incoming calling parties authorized to receive filtered call context upon detection of one of the authorized incoming calling parties.

Information for determining the context of a call may be gathered from a caller or callee profile, from routing information utilized by intermediary 42 from a device directory, from systems management server 28, or other databases of information. The context inference engine may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[caller name] Jon Smith
[caller device] Jane Doe's cell phone
[caller location] Central Time zone, Austin, Tex.
[subject] Project A
[billing] Jon Smith's business service provider C
[authenticated by] Jane Doe's cell phone, service provider G In addition, according to an advantage of the present invention, an incoming calling party identity of an incoming calling party utilizing incoming call origin device 55 may be authenticated in a manner similar to that described with reference to authenticated a caller identity in a VID. The incoming calling party places a call to either the caller or the callee while the caller and callee are currently participating in a call with one another.

For example, the following VID tag may be transferred to represent an incoming calling party identifier:

[incoming caller name] Allen Alto
[incoming call request] callee: Jane Doe
[incoming call subject] Disco Party The incoming calling party identity is preferably compared with authorized incoming calling party lists included in the context of a call. In particular, the context of a call may be updated to include incoming calling party lists when the call originates or upon detection of an incoming calling party.

If the incoming calling party identity is authorized to receive current call context, the current call context is filtered and output to incoming call origin device 55. In addition, the incoming calling party identity and any context determined for the incoming calling party request may be transferred to both the caller and callee. Alternatively, only the party to whom the incoming call is requested may receive the incoming calling party identity and context. However, if the requested party switches to the incoming calling party, the remaining party may receive the identity of the incoming calling party to receive information about why the call was switched.

For example, the incoming calling party may receive the following call context for the line number requested by the incoming calling party:

[current callee name] Tabitha Smith
[current caller name] Johnny Taboo
[current caller number] 222-3033-2020
[call duration] 20 minutes The previous call context example might be output to a parent calling home, where the parent is informed of the child who is utilizing the home phone, who the child is talking with, and the duration of the call. While a parent may not mind interrupting a child's conversation with a friend, that parent may not want to interrupt a call between a spouse and the spouse's client, and therefore may automatically select to leave a message or to try back at another time. Further, where the spouse does not switch the call over, a context for the reason the call was not switched is received.

Figure 3:
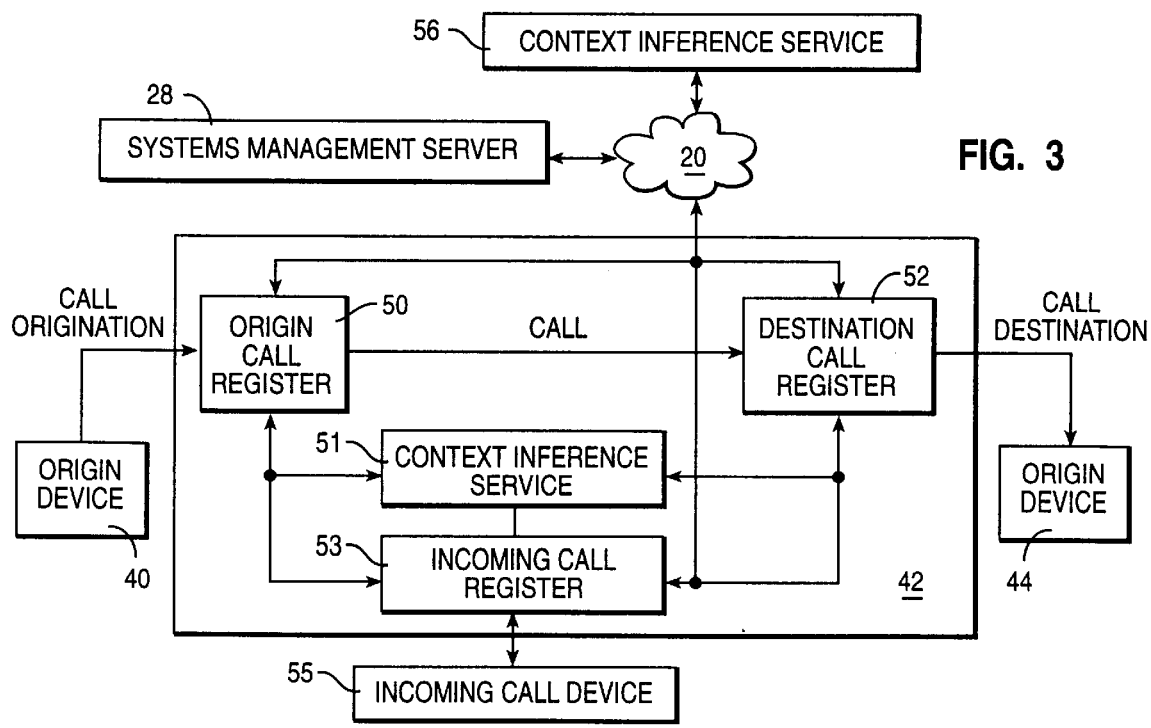
FIG. 3 depicts a block diagram of the flow of a call through a context inference system in accordance with the method, system, and program of the present invention.

With reference now to FIG. 3, there is depicted a block diagram of the flow of a call through a context inference system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, an parties called on behalf of, whether either of the parties is a backup to another party, the devices utilized to place and receive the call, the locations of the caller and callee, the billing method for the call, the path of the call, the subject matter of the call and/or filtering preferences. In the present invention, filtering preferences preferably include incoming calling parties authorized to receive filtered context information about a current call.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Device identity may be detected where a line subscriber profile indicates that one wireless device is programmed for use of a particular line number. In addition, origin device 40 may provide a signal indicating the identity of the device. For example, origin device 40 may be programmable to identify a particular office, room or other area in which the device is located.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information and service subscriptions of the caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference engine may infer the subject matter of a call based on the caller's schedule. The context inference engine may also infer the subject matter of a call based on the caller's business or the business associated with the line number utilized by the caller.

The call is preferably transferred through a voice channel to a destination switch, in which a destination call register 52 is created to hold the call. In addition, context for the call may be transferred through a signaling channel to the destination switch and loaded into destination call register 52.

Advantageously, the destination switch controls termination of the call at destination device 44. The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

In particular, the destination switch preference initiates at least one of context inference service 51 and context inference service 56 to determine the context of the recipient side of a call. Determining the context of the recipient side of a call may be performed in a manner similar to that described reference to determining the context of the caller side of a call. In addition, as will be further described, context inferences may be further enhanced when caller side and recipient side context information is combined.

In particular, the subscriber profile associated with destination device 44 may be accessed and utilized by the context inference service to determine context for the call. In addition, destination device 44 may return a device identifier to destination call register 52 or the identity of destination device 44 may be inferred from other context information. Further, the identity of the callee is preferably authenticated, such that the RVID and callee profile accessible according to RVID further enhance context information.

Context information determined for the recipient side of the call may be transferred to origin device 40 via origin call register 50. Filtering of the recipient said call context may be performed according to multiple factors, including callee filtering preferences. In particular, multiple entities may receive the filtered context information, where filtering preferences may be uniquely specified for each of the multiple entities.

In the present embodiment, filtering preferences for a call are received from line subscriber profiles, caller profiles, and/or callee profiles. Preferably, filtering preferences include preferences for filtering context information output to incoming calling parties. A line subscriber profile may establish authorized incoming calling parties for a particular line number. For example, a line subscriber owner may select himself as an authorized incoming calling party regardless of who is using the line. However, callers and callees may also select authorized incoming calling parties that follow the callers and callees to whichever telephony device being utilized.

In particular, filtering preferences for incoming calling parties may be specified according to an incoming calling party authenticated identity. However, the preferences may also be specified for other context criteria, such as the parties to the call, the location of the call, the devices utilized during the call, and other criteria. In addition, where an incoming calling party is not identifiable, that party may enter a pin number or other identifier that identifies the incoming calling party in the filtering preferences.

As illustrated, an incoming calling party preferably utilizes an incoming call origin device 55 to place a call to either the caller or the callee of a current call. A service provider for the incoming call device line number receives the call request and establishes an incoming call register 53.

The identity of the incoming calling party may be authenticated. In addition, the incoming calling party service provider may initiate a context inference service, such as context inference service 51, to determine the context of the incoming call.

The incoming calling party service provider detects that the caller or callee is already participating in a call. The context of the current call may be updated by the context inference service to determine filtered context authorized for output to incoming call device 55 according to the line number or incoming calling party authenticated identity.

The context inference service may also filter incoming calling party information for distribution to origin device 40 and/or destination device 44. Where the caller is requested by the incoming calling party, the caller filtering preferences may block the callee from receiving incoming calling party context or may allow the callee to received limiting incoming calling party context.

The called party may subscribe to a call waiting service and/or a call messaging service. The call waiting service and call messaging service may be provided within Intelligent Peripherals of trusted telephone network 46 or by a telco application service located outside trusted telephone network 46.

The call waiting service allows the called party to switch from the current call to a call with the incoming calling party, and then switch back to the previous call if desired. By receiving a context for the call from the incoming calling party, the called party may better determine whether to switch to the incoming calling party.

The messaging service preferably answers a call after a particular number of rings or other designated period of time. An incoming calling party may be transferred to a messaging service if the called party does not switch to the incoming calling party. In addition, a called party may select a preference for all incoming calls to be automatically switched to a messaging service. In this case, it is advantageous for the incoming calling party to view the call context occurring when the incoming calling party is transferred to the messaging service. Further, the incoming calling party may view the current call context and provide an input that automatically switches the incoming calling party to a messaging service. Moreover, a called party's preferences may select preferences for automatically transferring a call to a messaging service according to the current call context and/or the incoming calling party context.

Figure 4A:
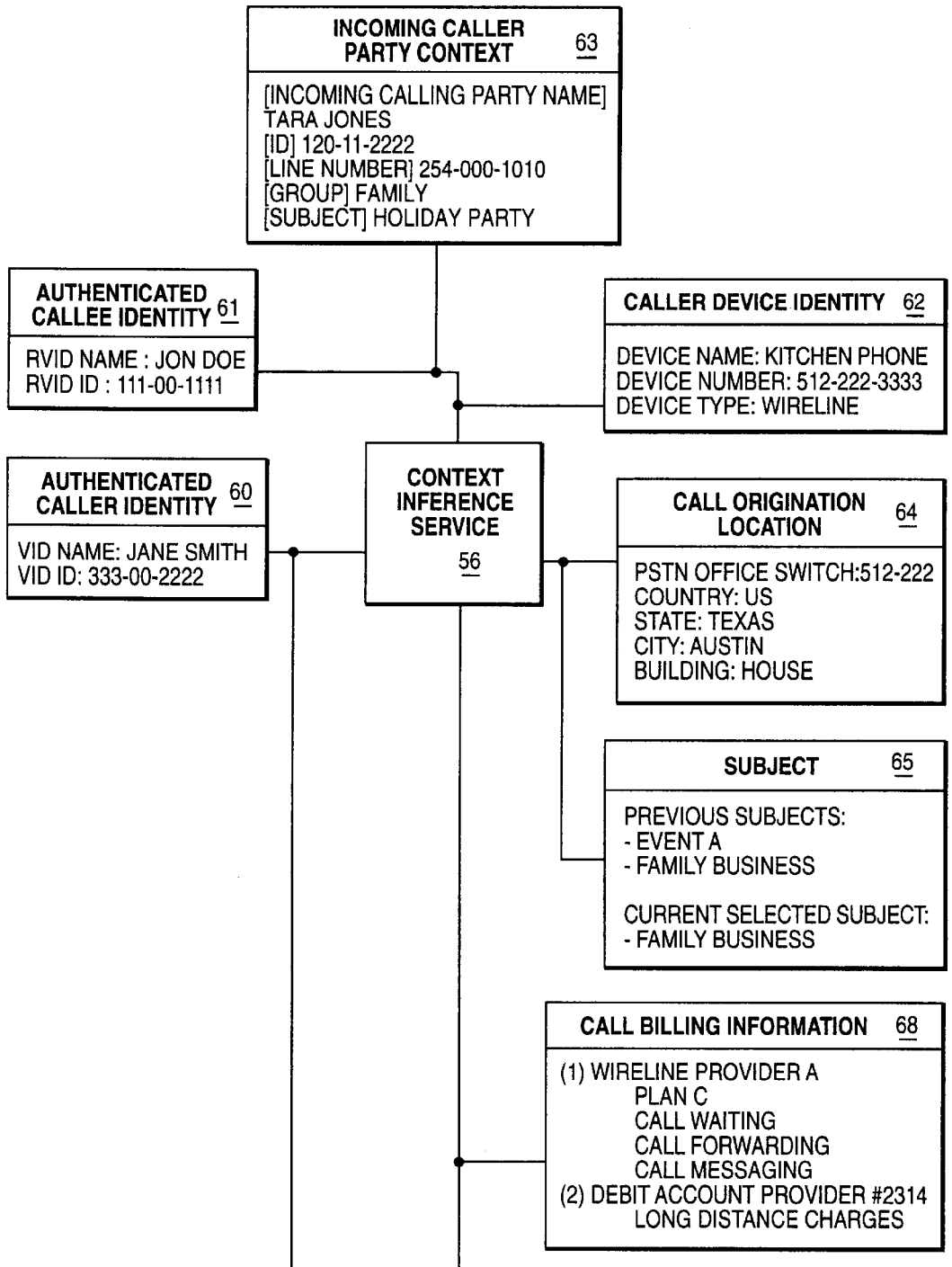
FIG. 4 illustrates an illustrative example of context for a call in accordance with the method, system, and program of the present invention.
Figure 4B:
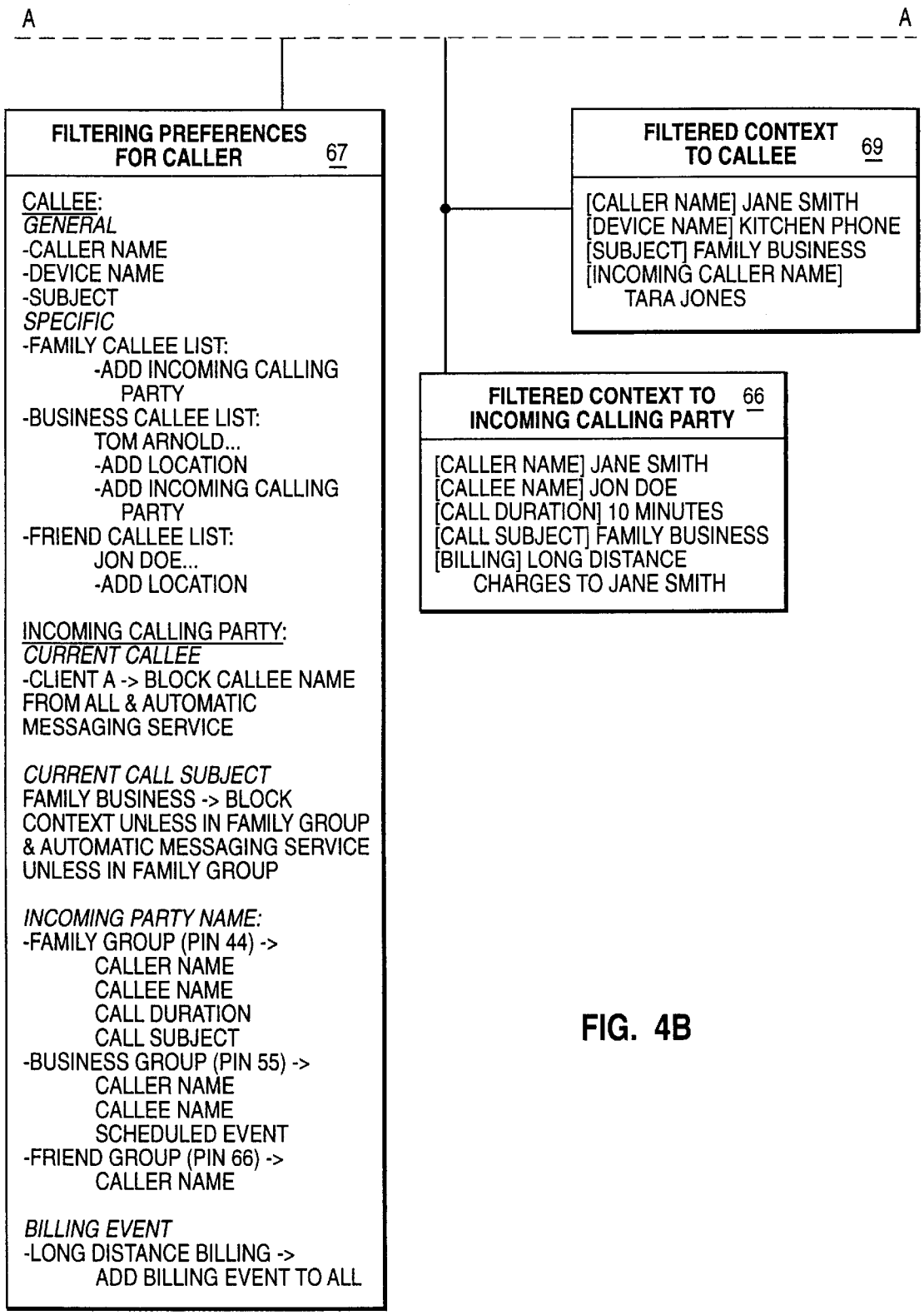

Referring now to FIG. 4, there is depicted an illustrative example of context for a call in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to AJon Doe@. Then, a call is placed by ATara Jones@ to AJane Smith@, where ATara Jones@ is detected as an incoming calling party.

First, authenticated caller identity context 60 is retrieved to indicate who is calling. Advantageously, the name and identifier of a caller may be determined by authenticating the voice of the caller or utilizing other caller identification. An authenticated identity may also indicate, for example, the device utilized to perform the authentication, the frequency of identity of authentication, and the number to tries to achieve identity authentication.

Next, an authenticated callee identity context 61 is retrieved to indicate who is receiving the call. Advantageously, the name and identifier of a callee may be determined by authenticating the voice of the callee or utilizing other callee identification.

In addition, although not depicted, a caller or callee identity may also indicate another party that the call has been placed on behalf of or answered on behalf of. Further, a callee identity may indicate that the callee is a backup for another caller.

Further, once an incoming calling party is detected, context inference service 56 preferably determines an incoming calling party context 63 that is filtered and transferred to the caller. In addition, incoming calling party context 63 is utilized to determine current call context output. In the example, the incoming calling party context includes the incoming calling party name, identifier, line number from which the incoming call originates, group identifier, and subject of the incoming call. Additional context information may also be determined.

Next, caller device identity context 62 is determined to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the subscriber of the line number. In addition, the name of the device may include a server system or private switching network identifier enabling the origin device. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

A call origination location context 64 is also determined to indicate the geographical location of the origination of a call and provide information for determining a device identity. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building assigned to the line number, here Aresidential@.

In addition, call billing information context 68 is provided to indicate the current billing and service providers for a call. Each caller may select multiple service providers and billing options that are accessible according to the caller VID. In the example, the caller's service provider processes the call and provides call forwarding, call waiting and call messaging services as part of a calling plan. Long distances service charges are billed to a debit account provider according to the caller VID.

A subject context 65 indicates previous subjects of calls by the caller from the device. The caller may be prompted to select from one of these previous subjects, stored according to VID in the caller profile. In this example, the caller has selected the subject of the call as Afamily business@. A caller may further select a level of urgency of the call, specify the type of family business, or other further specifications of the subject matter of a call. In addition to storing previous subjects according to caller and device, previous subjects may be stored according to the caller/callee combination, and retrieved when the caller/callee combination is detected. Moreover, a caller may be enabled to search through the database of previous subjects, organized according to caller, device, callee, time, location, and other criteria. A caller may also have a list of Afavorite subject matter@ from which quick subject matter selections may be made.

Filtering preferences context 67 are preferably accessed from a caller profile. First, filtering preferences include filtering the call context transferred to a callee. General context filtering preferences for a callee are selected, including the caller name, the device name, and the subject. In addition, specific context filtering preferences for a caller are selected according to groups of RVIDs. In the example, the caller has sorted RVIDs according to a family callee list, a business callee list, and a friend callee list. Additional context information is output according to the group that a callee falls under. Examples of the RVID names in the business callee list and friends callee list are depicted as ATom Arnold@ and AJon Doe@.

Second, filtering preferences includes filtering the call context according to an incoming calling party. In the example, context is filtered to an incoming calling party according to the current callee, the current call subject, the incoming calling party name, and a current call scheduled event, and a current billing event.

The present example depicts blocking the callee name from context output to an all incoming call parties. It may be advantageous for a caller to maintain the privacy of a client. Alternatively, the caller may set a preference for some incoming calling parties to receive the callee name. For example, where the caller has selected filtering according to the call subject, the context of the call is blocked from all incoming calling parties unless the incoming calling party is part of the family group.

With the context filtering preferences, a caller may indicate how a call should be handled when an incoming calling party is detected, depending on the call context. For example, where the current callee is Aclient A@ any incoming calling parties are automatically transferred to a messaging service. However, when the current call subject is family business, incoming calling parties are automatically transferred to a messaging service unless the incoming calling party is in the family group. The caller may specify other preferences for call routing, including transferring the call to a backup, holding the call for a particular period of time, and other services offered to the caller.

In addition, the present example depicts filtering context output to an incoming calling party according to a group under which the incoming calling party name falls. In addition to receiving an authenticated identifier that is sorted by the caller according to a group, the incoming calling party may enter a pin number. In the example, an incoming calling party in the family group receives the most context information, while an incoming calling party in the friend group receives the least context information.

Although not depicted, the call context may also include scheduled events for a caller or callee accessed from a caller or callee schedule located at a telephony device or a data management server. Scheduled events may include, for example, meetings and appointments including the date, time, place and others who may be participating. In the example, a scheduled event is part of the context provided to a business group incoming calling party. The filtering preferences may be further specified to indicate that only business related scheduled events are output with context to an incoming business group calling party.

Further, in the example, a billing event may be utilized to filter context. In the example, the caller has selected to add a billing event of long distance service, when long distance service is being utilized. By indicating to an incoming calling party that a current call is long distance, the incoming calling party receives additional information about why the caller may not answer the call or if the caller does answer, the importance of a short conversation. In addition, it is advantageous to indicate to the incoming calling party which current party to the call is paying for the long distance service.

As an example, filtered call context to the callee 69 includes the tagged VID for transfer to the callee, including context information. Here, the callee RVID is included in the friend group, so friend filtering preferences are utilized. The caller name, device name, subject of the call, and incoming caller name are filtered into a context packet designed for the callee.

In another example, filtered call context to the incoming calling party 66 includes the tagged VID for transfer to the incoming calling party, including context information. In the example, since the incoming calling party is included in the family group, the filtered context includes a caller name, a callee name, a call duration, a call subject and a billing event. In alternate embodiments, other types of context may be included in the filtered context output to an incoming calling party.

Although not depicted, in a simplified system, caller filtering preference may include a single list of authorized incoming calling party identifiers, where if the incoming calling party is authorized, the party receives context information for the call. In particular, the system may be further simplified to identify incoming calling parties according to a line number and to provide context to the incoming calling parties of the line numbers and line subscriber names for the current call.

Figure 5A:
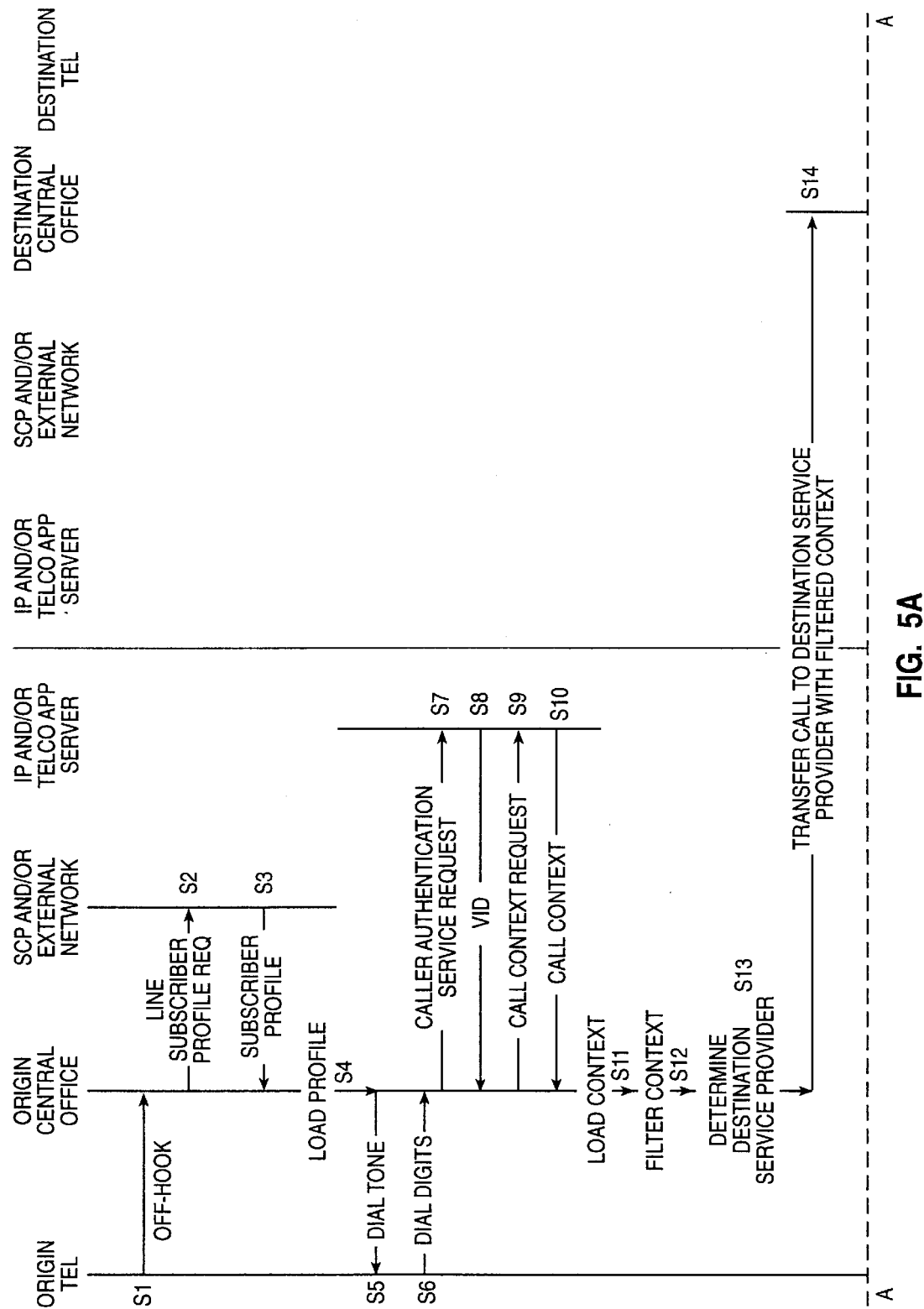
FIGS. 5a–5d depicts a flow diagram of a signal flow and processing of a call in accordance with the method, system, and program of the present invention.
Figure 5B:
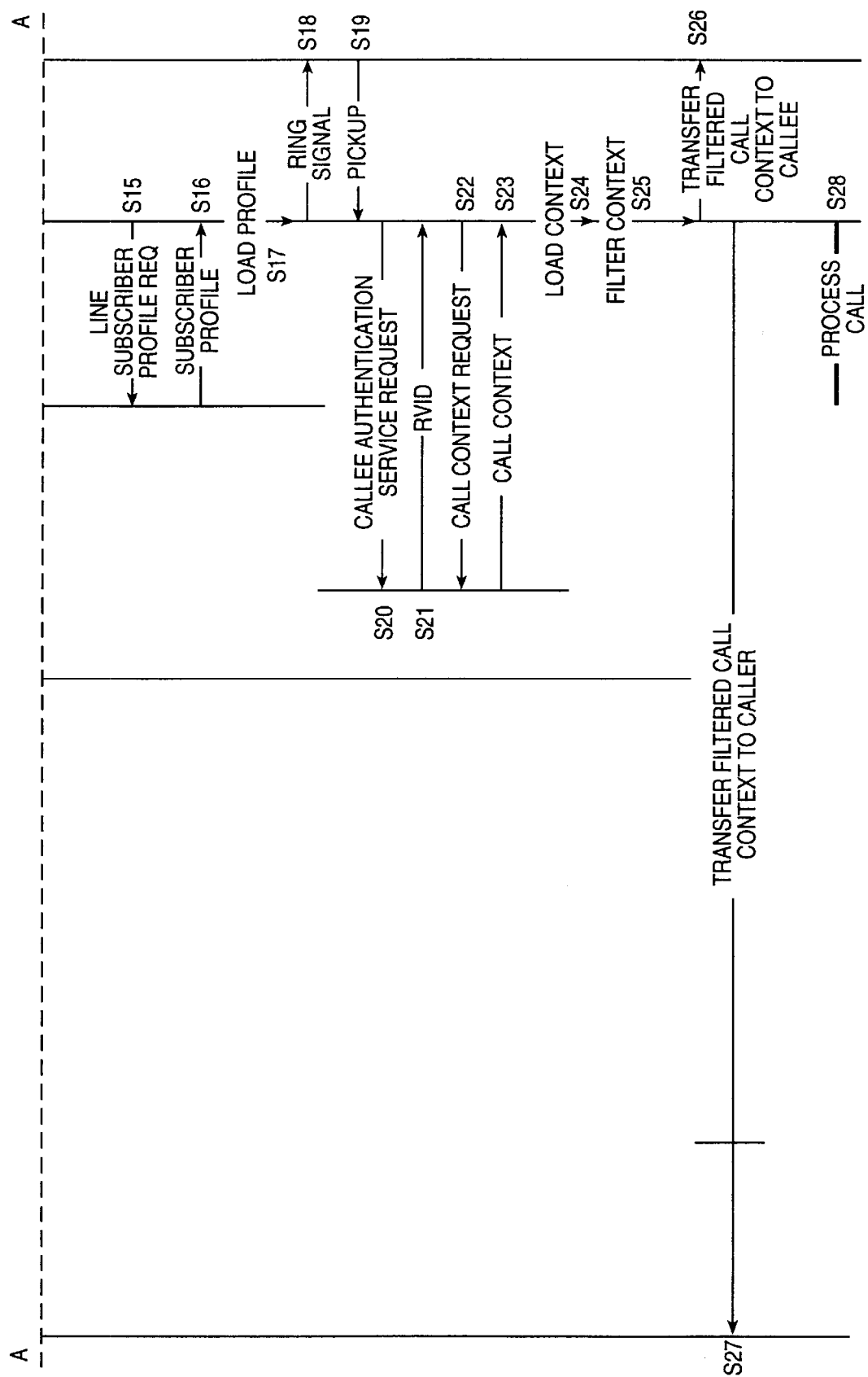
Figure 5C:
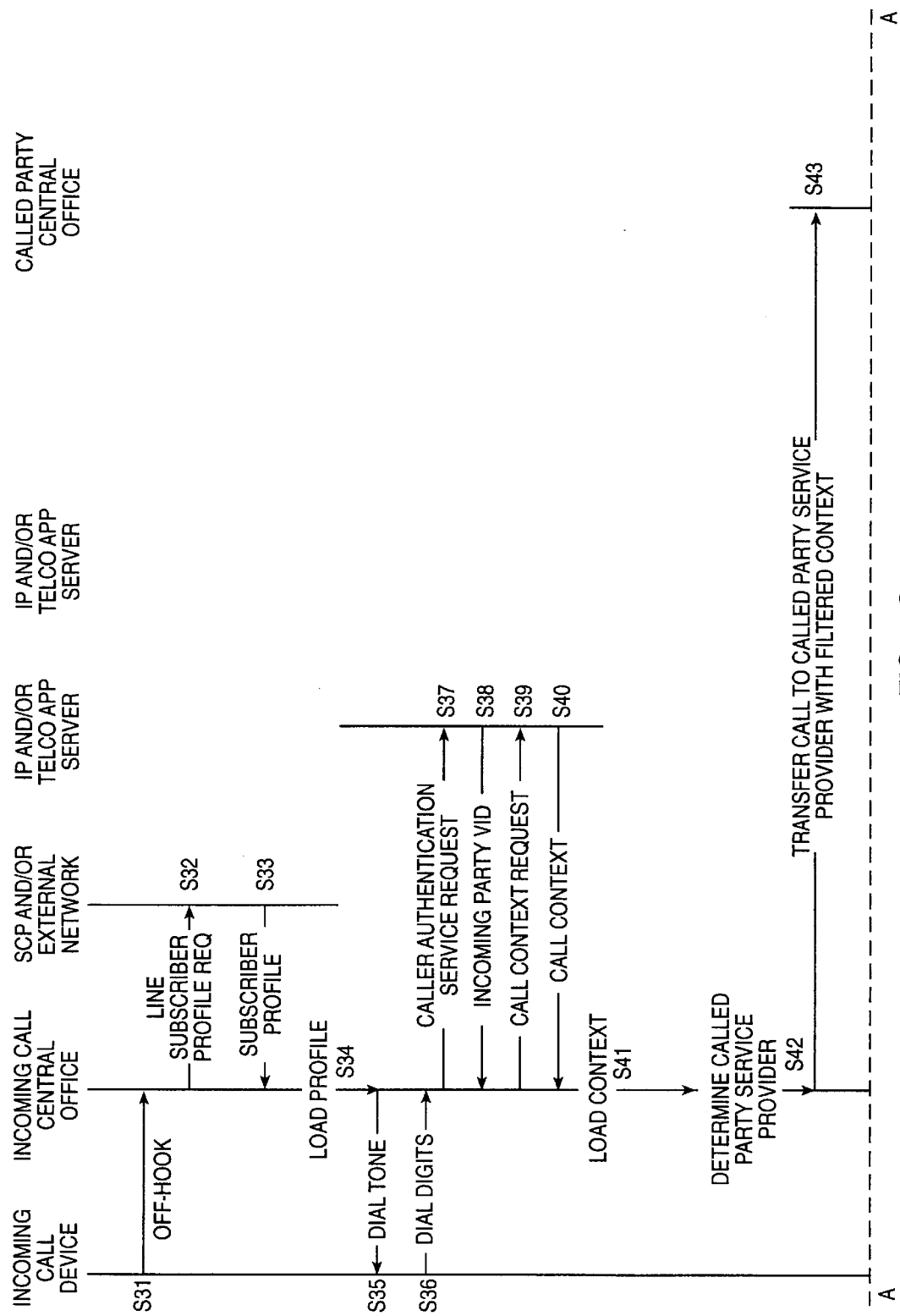
Figure 5D:
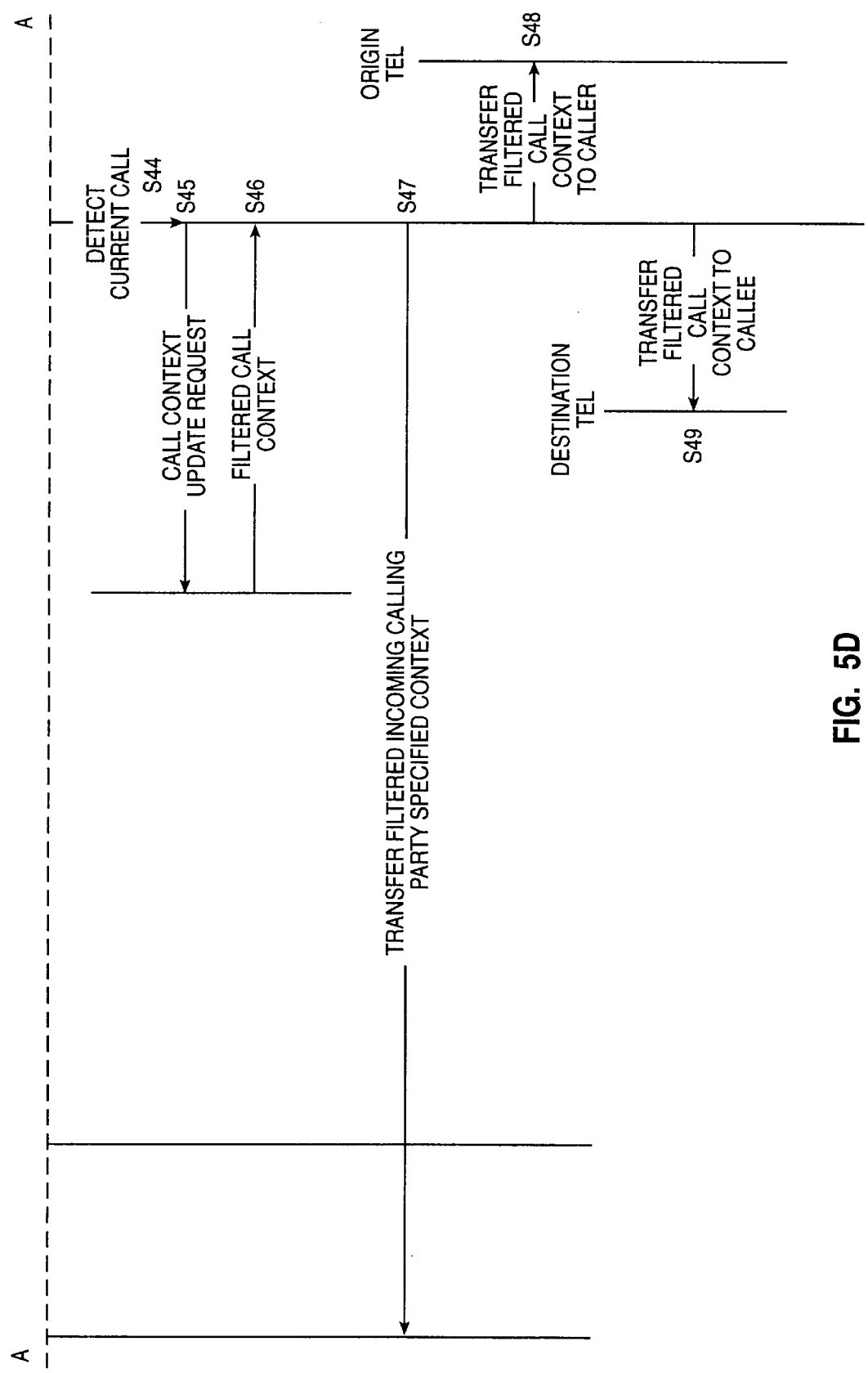

Referring now to FIGS. 5a–5b, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

Thereafter, the central office extends a call context request to a context inference service available from an IP or telco application server (step S9). The context inference service preferably accesses and loads a caller profile according to VID into the origin call register. Utilizing the line number, line subscriber profile, VID and caller profile, the context inference service preferably determines a context for the call. The call context is returned to the origin central office (step S10).

Next, the context is loaded into the call register (step S11). In addition, the context is filtered according to filtering factors (step S12). In particular, an IP or telco application server provide filtering service.

A destination service provider for the call according to the dialed digits is determined from a directory (step S13). Next, the call is transferred to the destination service provider with filtered context (step S14).

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). If the call is answered, a pickup signal is returned to the destination central office (step S19). In response to detecting the pickup, a call authentication service request is initiated (step S20). The identity of the callee is preferably authenticated by an IP or telco application server and returned as a RVID to the destination central office (step S21).

Thereafter, the destination central office extends a call context request to the context inference service at an IP or telco application server to further determine the context of the call (step S22). The context inference service preferably determines context for the call from the recipient side of the call. In addition, the context inference service may determine context from the call in view of both the origination and reception sides of the call. The call context is preferably returned to the destination central office (step S23) and loaded into the call register (step S24). In addition, the context is preferably filtered for receipt by the caller and the callee (step S25).

The filtered call context is preferably transmitted via the signal channel to the destination device (step 26). In particular, the call context is preferably filtered for the callee to indicate the caller and the context of the caller's call request. While in the present example, call context information is transmitted to the destination device after determining call context for the callee, in alternate embodiments, call context may be transmitted to the callee at different points during the call as context is available. For example, the VID and device identity may be transmitted with a ring signal to the destination device, such that the callee is informed of who is calling and what device is calling before answering. In addition, complete context information may be transmitted after the call context for both sides of the call has been determined. Moreover, during a call, call context may continue to be inferred and transmitted to the destination device, such as a changing location of the caller.

The filtered call context is also preferably transmitted via the signal channel back to the origin device (step S27). In particular, the call context is preferably filtered for the caller to indicate the callee and the context of the callee answering the call. While in the present invention the RVID is transmitted as part of the filtered call context, in alternate embodiments the RVID may be transferred after determined.

As an alternative to initiating the context inference service from both the origin central office and the destination central office, only the destination central office may initiate the context inference service for determining a call context based on all the profile and identity information collected at the origin central office and destination central office.

The call is then processed to facilitate communications between the origin device and a destination device accessed in association with the dialed digits (step S28). In particular, processing the call also includes monitoring the call to determine additional call context for storage in association with the call and context updates provided to the caller and callee.

At some point after the current call begins, a call is placed for either the caller or the callee by an incoming calling party. An off-hook signal is detected from an incoming call origin device (step S31). The incoming call central office requests a line subscriber profile for the incoming call line number from an SCP or an external network data storage system (step S32). A line subscriber profile is returned to the incoming call central office (step S33) and loaded into a register initiated for the call in the incoming call central office (step S34).

A dial tone is extended from the incoming call central office to the incoming call origin device (step S35). Dialed digits are detected from the incoming call origin device (step S36). Next, an authentication service request is output to an Intelligent peripheral or telco application server (step S37). An incoming calling party identity is preferably authenticated and transferred to the incoming call center office (step S38). Alternatively, the incoming call origin device may authenticate the incoming calling party identity.

Next, a call context request is transferred to the Intelligent peripheral or telco application server (step S39). A call context is preferably determined from the incoming calling party identity, device identity, line subscriber profile, and other information associated with the call. A filtered call context is returned to the incoming call central office (step S40) and loaded with the call in the call register (step S41).

A called party service provider is preferably determined from the dialed digits (step S42) and the call is transferred with the filtered context to the called party service provider (step S43). For purposes of the present invention, the called party central office detects the current call between the caller and callee, where the incoming calling party has requested dialed digits accessing either the caller or callee device (step S44). The caller party central office transfers a call context update request to an Intelligent peripheral or telco application server (step S45). A context inference service preferably updates a call context according to the incoming calling party context and filters current call context for output to the incoming calling party, caller, and callee. Filtered context packets are returned to the caller party central office (step S46).

The filtered incoming calling party specified context is transferred to the incoming call origin device (step S47). In addition, the filtered call context is transferred to the caller (step S48) and to the callee (step S49). In addition, although not depicted, a signal may be output to the called party that a call is incoming. The incoming call may be switched to by the called party or the incoming call may be switched to a messaging service.

Figure 6:
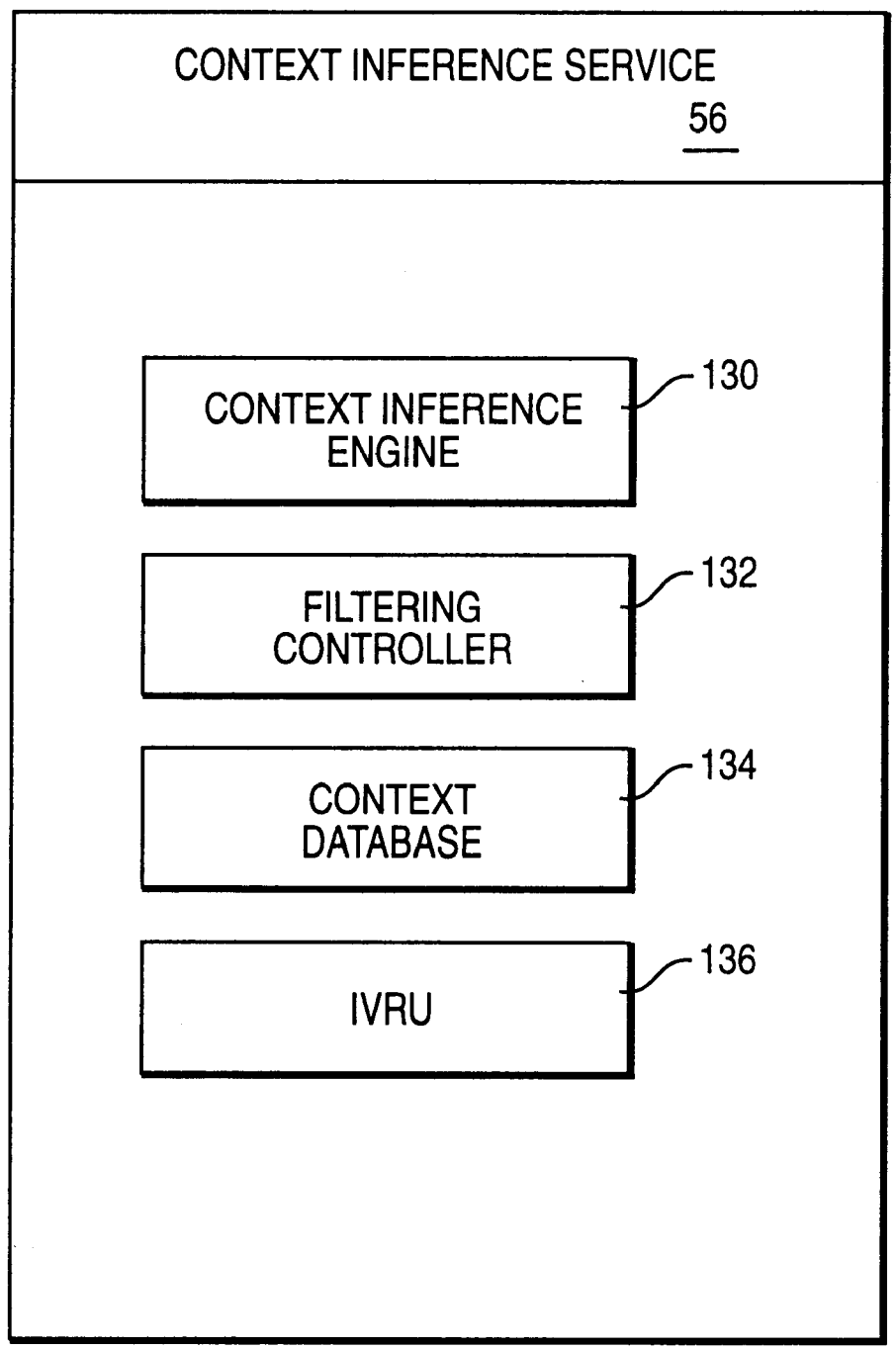
FIG. 6 illustrates a block diagram of a context inference service in accordance with the method, system, and program of the present invention.

Referring now to FIG. 6, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 130. Context inference engine 130 preferably determines the context for a call through information accessible for the call and through inferences from that information. In addition, the context of a call is preferably updated during a call. For example, where an incoming call is received during a call, the call context is updated.

In addition, a filtering controller 132 may filter context information according to the entity receiving the information. For example, the context of a call transferred to an incoming call party is preferably filtered according to line subscriber, caller, and callee preferences. In addition, for example, the context of an incoming call may be filtered according to the incoming calling party's filtering preferences for distribution to the caller and/or callee.

A context database 134 preferably records and stores context for each call processed by context inference service 56. Context database 134 may be later accessed to provide verification and context for billed call transactions. In addition, context database 134 may be accessed by context inference engine 130 to determine current context according to previous context.

An interactive voice recognition unit (IVRU) 136 preferably prompts the caller and callee to provide information required for determining context and detects caller or callee entries. In addition, IVRU 126 may prompt the caller to specify filtering for a particular call.

Figure 7:
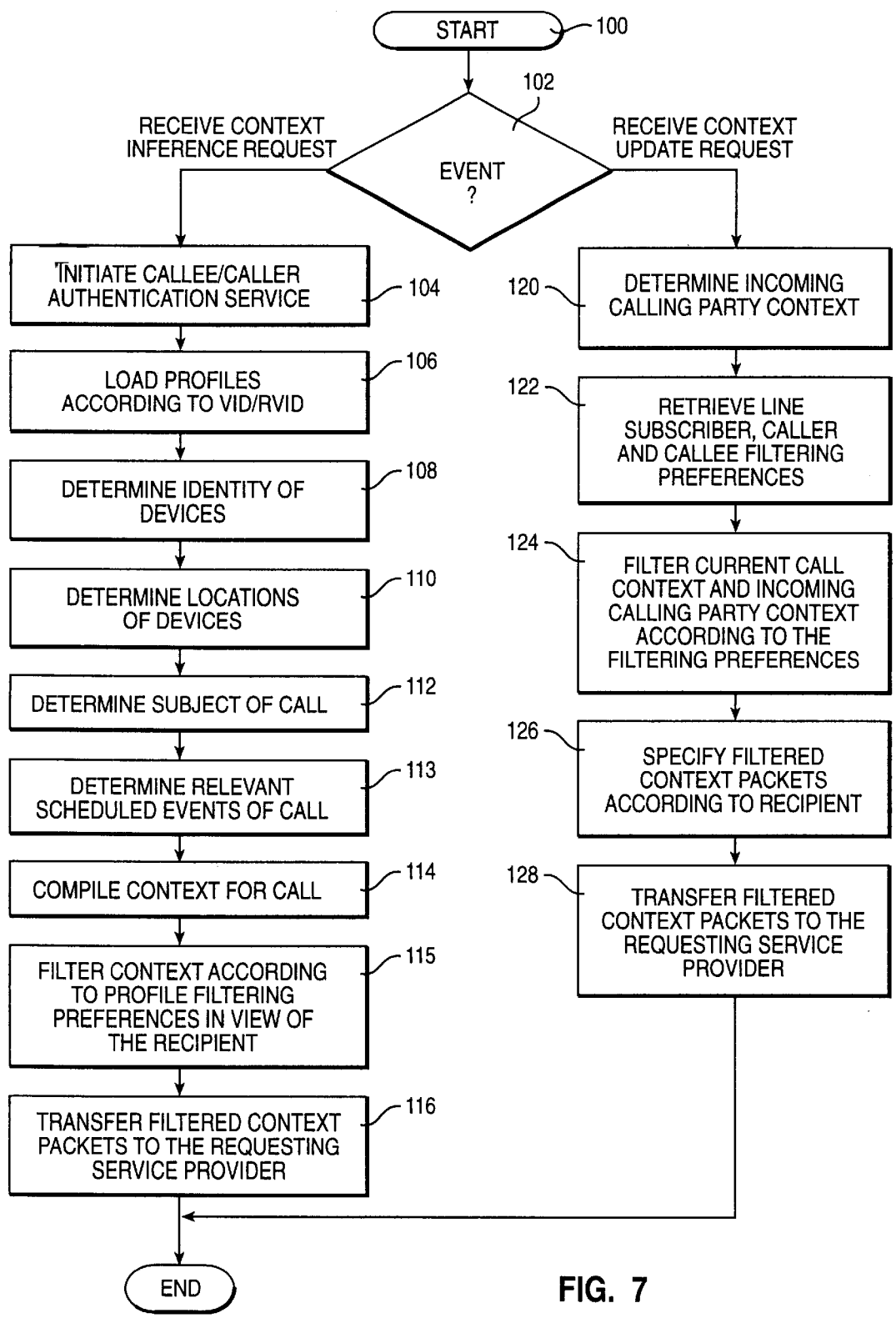
FIG. 7 depicts a high level logic flowchart of a process and program for determining call context in accordance with the present invention.

With reference now to FIG. 7, there is illustrated a high level logic flowchart of a process and program for determining call context in accordance with the present invention. As depicted, the process starts at block 100 and thereafter proceeds to block 102. Block 102 depicts a determination as to what event occurred when an event occurs. If a request to determine a call context is received, then the process passes to block 104. If a request to update context is received, then the process passes to block 120.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Block 113 depicts accessing a calendar and other schedule related data for a caller and callee to determine relevant scheduled events during a call. Relevant scheduled events may also aid in inferring the location of a caller or callee. Relevant scheduled events may include meetings, appointments, goals, and other information from which additional context for a call may be determined.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider, and the process ends.

Block 120 illustrates determining the incoming calling party context, including an incoming calling party identifier. Next, block 122 depicts retrieving the line subscriber, caller and callee filtering preferences. Thereafter block 124 illustrates filtering the current call context and incoming calling party context according to the filtering preferences of the line subscriber, caller and callee.

Block 126 depicts specifying the filtered context packets according to the intended recipients. Next, block 128 illustrates transferring the filtered context packets to the requesting service provider, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for identifying call parties, said method comprising:

identifying a context for a current call between a caller and a callee, wherein said context comprises at least an identity of said caller and an identity of said callee to said current call;

detecting an identifier for an incoming calling party attempting to call one from among said caller and said called during said current call;

filtering said context according to said identifier for said incoming calling party; and controlling output of said filtered context to said incoming calling party.

2. The method for identifying call parties according to claim 1, wherein said context further comprises a caller device identity, a callee device identity, a caller location, a callee location, a call subject matter, a call billing plan, an on behalf of party to said call, a backup party to said call.

3. The method for identifying call parties according to claim 1, wherein said identity of said caller and said identity of said callee are authenticated from voice samples provided by said caller and said callee.

4. The method for identifying call parties according to claim 1, wherein said identity of said caller and said identity of said callee comprise a caller line number and a callee line number.

5. The method for identifying call parties according to claim 1, wherein said identity of said caller and said identity of said callee comprise a caller line subscriber name and a callee line subscriber name.

6. The method for identifying call parties according to claim 1, wherein said identifier for said incoming calling party is a voice authenticated identifier.

7. The method for identifying call parties according to claim 1, wherein said identifier for said incoming calling party is a line number utilized by said incoming calling party.

8. The method for identifying call parties according to claim 1, wherein said identifier for said incoming calling party is a line subscriber name of a line number utilized by said incoming calling party.

9. The method for identifying call parties according to claim 1, wherein filtering said context according to said identifier for said incoming calling party further comprises:

retrieving a preferred calling party list for at least one from among said caller and said callee, wherein said preferred calling party list indicates filtering preferences for filtering said context for output to said incoming calling party; and filtering said context according to said preferred calling party list.

10. The method for identifying call parties according to claim 1, wherein said incoming calling party receives a busy signal with said filtered context.

11. The method for identifying call parties according to claim 1, wherein said incoming calling party receives a ring signal with said filtered context.

12. The method for identifying call parties according to claim 1, further comprising:

switching said call from said caller to said incoming calling party.

13. The method for identifying call parties according to claim 1, further comprising:
   switching said call from said callee to said incoming calling party.

14. The method for identifying call parties according to claim 1, further comprising:
   transferring said incoming calling party to a messaging service.

15. The method for identifying call parties according to claim 1, further comprising:
   controlling output of said identifier for said incoming calling party to at least one party to said call from among said caller and said callee, wherein said at least one party to said call is said party to said current call not attempted to be called by said incoming calling party.

16. A system for identifying call parties, said system comprising:
   a context inference service server communicatively connected to a trusted telephone network;
   means for identifying a context for a current call between a caller and a callee at said context inference service server, wherein said context comprises at least an identity of said caller and an identity of said callee to said current call;
   means for detecting an identifier for an incoming calling party attempting to call one from among said caller and said callee during said current call at said context inference service server;
   means for filtering said context according to said identifier for said incoming calling party; and
   means for controlling output of said filtered context to said incoming calling party.

17. The system for identifying call parties according to claim 16, wherein said context further comprises a caller device identity, a callee device identity, a caller location, a callee location, a call subject matter, a call billing plan, an on behalf of party to said call, a backup party to said call.

18. The system for identifying call parties according to claim 16, wherein said identity of said caller and said identity of said callee are authenticated from voice samples provided by said caller and said callee.

19. The system for identifying call parties according to claim 16, wherein said identity of said caller and said identity of said callee comprise a caller line number and a callee line number.

20. The system for identifying call parties according to claim 16, wherein said identity of said caller and said identity of said callee comprise a caller line subscriber name and a callee line subscriber name.

21. The system for identifying call parties according to claim 16, wherein said identifier for said incoming calling party is a voice authenticated identifier.

22. The system for identifying call parties according to claim 16, wherein said identifier for said incoming calling party is a line number utilized by said incoming calling party.

23. The system for identifying call parties according to claim 16, wherein said identifier for said incoming calling party is a line subscriber name of a line number utilized by said incoming calling party.

24. The system for identifying call parties according to claim 16, wherein filtering said context according to said identifier for said incoming calling party further comprises:
   means for retrieving a preferred calling party list for at least one from among said caller and said callee, wherein said preferred calling party list indicates filtering preferences for filtering said context for output to said incoming calling party; and
   means for filtering said context according to said preferred calling party list.

25. The system for identifying call parties according to claim 16, wherein said incoming calling party receives a busy signal with said filtered context.

26. The system for identifying call parties according to claim 16, wherein said incoming calling party receives a ring signal with said filtered context.

27. The system for identifying call parties according to claim 16, further comprising:
   means for switching said call from said caller to said incoming calling party.

28. The system for identifying call parties according to claim 16, further comprising:
   means for switching said call from said callee to said incoming calling party.

29. The system for identifying call parties according to claim 16, further comprising:
   means for transferring said incoming calling party to a messaging service.

30. The system for identifying call parties according to claim 16, further comprising:
   means for controlling output of said identifier for said incoming calling party to at least one from among said caller and said callee.

31. A computer program product for identifying call parties, said computer program product comprising:
   a recording medium;
   means, recorded on said recording medium, for identifying a context for a current call between a caller and a callee, wherein said context comprises at least an identity of said caller and an identity of said callee to said current call;
   means, recorded on said recording medium, for detecting an identifier for an incoming calling party attempting to call one from among said caller and said callee during said current call;
   means, recorded on said recording medium, for filtering said context according to said identifier for said incoming calling party; and
   means, recorded on said recording medium, for controlling output of said filtered context to said incoming calling party.

32. The computer program product for identifying call parties according to claim 31, further comprising:
   means, recorded on said recording medium, for retrieving a preferred calling party list for at least one from among said caller and said callee, wherein said preferred calling party list indicates filtering preferences for filtering said context for output to said incoming calling party; and
   means, recorded on said recording medium, for filtering said context according to said preferred calling party list.

33. The computer program product for identifying call parties according to claim 31, further comprising:
   means, recorded on said recording medium, for switching said call from said caller to said incoming calling party.

34. The computer program product for identifying call parties according to claim 31, further comprising:
   means, recorded on said recording medium, for switching said call from said callee to said incoming calling party.

35. The computer program product for identifying call parties according to claim 31, further comprising:

means, recorded on said recording medium, for transferring said incoming calling party to a messaging service.

36. The computer program product for identifying call parties according to claim 31, further comprising:

means, recorded on said recording medium, for controlling output of said identifier for said incoming calling party to at least one from among said caller and said callee.

37. A method for controlling call identification, said method comprising:

identifying a caller identifier and a callee identifier for a caller and a callee of a current call;

responsive to detecting an incoming calling party identifier for an incoming calling party attempting to call one from among said caller and said callee during said current call, only transferring said caller identifier and said callee identifier to said incoming calling party if said incoming calling party identifier is included in a plurality of preferred incoming parties for said caller and said callee.

38. The method for controlling call identification according to claim 37, wherein said incoming calling party is calling said caller.

39. The method for controlling call identification according to claim 38, wherein said caller is enabled to switch said call from said callee to said incoming calling party.

40. The method for controlling call identification according to claim 37, wherein said incoming calling party is calling said callee.

41. The method for controlling call identification according to claim 40, wherein said callee is enabled to switch said call from said caller to said incoming calling party.

42. The method for controlling call identification according to claim 37, wherein said caller identifier is at least one from among a line number and a line subscriber name.

43. The method for controlling call identification according to claim 37, wherein said callee identifier is at least one from among a line number and a line subscriber name.

44. A system for controlling call identification, said system comprising:

a telephone network for managing a call;

means for identifying a caller identifier and a callee identifier for a caller and a callee of said call;

means responsive to detecting an incoming calling party identifier for an incoming calling party to said call, for only transferring said caller identifier and said callee identifier to said incoming calling party if said incoming calling party identifier is included in a plurality of preferred incoming parties for said caller and said callee.

45. The system for controlling call identification according to claim 44, wherein said incoming calling party is calling said caller.

46. The system for controlling call identification according to claim 45, wherein said caller is enabled to switch said call from said callee to said incoming calling party.

47. The system for controlling call identification according to claim 44, wherein said incoming calling party is calling said callee.

48. The system for controlling call identification according to claim 47, wherein said callee is enabled to switch said call from said caller to said incoming calling party.

49. The system for controlling call identification according to claim 44, wherein said caller identifier is at least one from among a line number and a line subscriber name.

50. The system for controlling call identification according to claim 44, wherein said callee identifier is at least one from among a line number and a line subscriber name.

51. A computer program product for controlling call identification, said computer program product comprising:

a recording medium;

means, recorded on said recording medium, for identifying a caller identifier and a callee identifier for a caller and a callee of said call;

means, recording on said recording medium, for only transferring said caller identifier and said callee identifier to said incoming calling party if said incoming calling party identifier is included in a plurality of preferred incoming parties for said caller and said callee, responsive to detecting an incoming calling party identifier for an incoming calling party to said call.

* * * * *